United States Patent
Yu et al.

(10) Patent No.: US 10,393,040 B2
(45) Date of Patent: Aug. 27, 2019

(54) CONTROL METHOD OF EGR VALVE FOR VEHICLE AND CONTROL SYSTEM FOR THE SAME

(71) Applicant: Hyundai Motor Company, Seoul (KR)

(72) Inventors: Seung Eun Yu, Seoul (KR); Young Ho Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 159 days.

(21) Appl. No.: 15/365,837

(22) Filed: Nov. 30, 2016

(65) Prior Publication Data

US 2017/0328290 A1  Nov. 16, 2017

(30) Foreign Application Priority Data

May 13, 2016  (KR) .................. 10-2016-0058790

(51) Int. Cl.
*F02D 41/00*  (2006.01)
*F02D 41/24*  (2006.01)
(Continued)

(52) U.S. Cl.
CPC ..... *F02D 41/0052* (2013.01); *F02D 41/0002* (2013.01); *F02D 41/005* (2013.01);
(Continued)

(58) Field of Classification Search
CPC ............ F02D 41/0052; F02D 41/0002; F02D 41/005; F02D 41/1497; F02D 41/22;
(Continued)

(56) References Cited

U.S. PATENT DOCUMENTS 5,666,924 A * 9/1997 Kadota ............... F02D 41/0037
                                                    123/198 D
7,421,333 B2 * 9/2008 Sawada ................ F01N 3/0842
                                                    123/568.21
(Continued)

FOREIGN PATENT DOCUMENTS

JP  2006-183485 A  7/2006
JP  2010-1790 A    1/2010
(Continued)

*Primary Examiner* — Lindsay M Low
*Assistant Examiner* — John D Bailey
(74) *Attorney, Agent, or Firm* — Morgan, Lewis & Bockius LLP

(57) ABSTRACT

A method and system for controlling an EGR valve for a vehicle may include an adjusting step of reducing the amount of air flowing into an engine at operation points of the engine lower than a predetermined value at each of the operation points by a controller; a learning step of maintaining, as a reduction-learning amount, a reduction amount of the amount of air from the predetermined value before a malfunction occurs, by the controller, when a malfunction occurs in the engine due to the reduction in the amount of air; a compensating step of determining a compensating air amount at each of the operation points by applying the reduction amount to the predetermined value by the controller; and an EGR controlling step of controlling an EGR-opening amount to satisfy the compensating air amount for a current operation time after the compensating step.

5 Claims, 3 Drawing Sheets

(51) Int. Cl.
  *F02D 41/22* (2006.01)
  *F02M 26/52* (2016.01)
  *F02D 41/14* (2006.01)

(52) U.S. Cl.
  CPC ......... *F02D 41/1497* (2013.01); *F02D 41/22* (2013.01); *F02D 41/2438* (2013.01); *F02D 41/2451* (2013.01); *F02M 26/52* (2016.02); *F02D 2200/101* (2013.01); *Y02T 10/42* (2013.01); *Y02T 10/47* (2013.01)

(58) Field of Classification Search
  CPC ............ F02D 41/2438; F02D 41/2451; F02D 2200/101; F02D 41/18; F02D 41/0065; F02D 41/123; F02M 26/52; Y02T 10/42; Y02T 10/18
  USPC ......... 123/568.16, 568.11, 568.19, 330, 704, 123/345, 389, 391, 402, 683, 681, 403, 123/677, 493, 568.21, 568.22; 60/278
  See application file for complete search history.

(56) References Cited

U.S. PATENT DOCUMENTS

| | | | | |
|---|---|---|---|---|
| 7,913,674 B2* | 3/2011 | Tsuda | ........................ | F02D 9/02 123/568.16 |
| 7,953,540 B2* | 5/2011 | Ito | ........................ | F02M 26/38 701/103 |
| 8,346,462 B2* | 1/2013 | Nakamura | .......... | F02D 41/0052 123/568.16 |
| 9,650,972 B2* | 5/2017 | Honda | ................ | F02D 41/0002 |
| 2006/0196485 A1* | 9/2006 | Kimura | .................. | F02M 26/48 123/568.16 |
| 2007/0062499 A1* | 3/2007 | Miyasako | ............. | F02B 77/082 123/568.16 |
| 2007/0089401 A1* | 4/2007 | Nieuwstadt | ......... | F02D 41/0065 60/285 |
| 2007/0198163 A1* | 8/2007 | Yasui | ...................... | F02D 21/08 701/103 |
| 2008/0264045 A1* | 10/2008 | Hara | ..................... | F01N 3/0222 60/295 |
| 2009/0107225 A1* | 4/2009 | Ishizuka | .............. | F02D 41/1498 73/114.15 |
| 2009/0126707 A1* | 5/2009 | Tsuda | ........................ | F02D 9/02 123/568.16 |
| 2010/0050999 A1* | 3/2010 | Murata | ............... | F02D 41/0052 123/568.11 |
| 2010/0186726 A1* | 7/2010 | Takagi | ................ | F02D 41/0055 123/568.16 |
| 2010/0263627 A1* | 10/2010 | Whitney | ................. | F02D 11/10 123/399 |
| 2010/0294253 A1* | 11/2010 | Kawase | .............. | F02D 41/0047 123/568.16 |
| 2012/0095664 A1* | 4/2012 | Nakamura | .......... | F02D 41/0052 701/102 |
| 2013/0090839 A1* | 4/2013 | Ishigami | ............. | F02D 41/0005 701/108 |
| 2013/0158841 A1* | 6/2013 | Ito | ....................... | F02D 41/0085 701/104 |
| 2015/0361872 A1* | 12/2015 | Takaki | .................... | F02D 21/08 123/568.11 |
| 2016/0090935 A1* | 3/2016 | Tanaka | .................... | F02D 41/26 701/104 |
| 2016/0146136 A1* | 5/2016 | Surnilla | ................. | F02D 17/02 123/568.21 |
| 2016/0237924 A1* | 8/2016 | Azizou | ............... | F02D 41/0072 |
| 2016/0264125 A1* | 9/2016 | Kanno | .................. | B60W 20/13 |
| 2016/0290254 A1* | 10/2016 | Nozaki | ............... | F02D 41/0002 |

FOREIGN PATENT DOCUMENTS

| | | |
|---|---|---|
| KR | 10-2005-0099569 A | 10/2005 |
| KR | 10-2009-0061830 A | 6/2009 |
| KR | 10-2010-0064880 A | 6/2010 |
| KR | 10-2014-0028635 A | 3/2014 |

* cited by examiner

CONTROL METHOD OF EGR VALVE FOR VEHICLE AND CONTROL SYSTEM FOR THE SAME

CROSS REFERENCE TO RELATED APPLICATION

The present application claims priority to Korean Patent Application No. 10-2016-0058790, filed May 13, 2016, the entire contents of which is incorporated herein for all purposes by this reference.

BACKGROUND OF THE INVENTION

Field of the Invention

The present invention relates to a control method of an exhaust gas recirculation (EGR) valve for a vehicle and a control system for the same and, more particularly, to a method of controlling an EGR valve of an EGR system for sending some of exhaust gas from an engine back to an intake manifold, and a system for controlling the EGR valve.

Description of Related Art

A vehicle may be equipped with an EGR system to reduce noxious substances that are discharged along with exhaust gas. Such an EGR system has an EGR channel for exhaust gas to flow to an intake manifold and an EGR valve for controlling the amount of exhaust gas flowing through the EGR channel.

Meanwhile, when external environmental conditions are poor or the operation period of an engine is not suitable, the efficiency of operation of the engine may be reduced; for example, the engine may malfunction when the EGR system is operated, which is problematic.

Accordingly, it is an important matter for a vehicle equipped with an EGR system to determine the opening amount for EGR in order to secure stability of operation of an engine and increase the amount of exhaust gas using EGR.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of controlling an exhaust gas recirculation (EGR) valve for a vehicle to minimize noxious substances in exhaust gas by increasing the amount of EGR while securing stable combustion in an engine, and a method of controlling the EGR valve.

In an aspect of the present invention, there is provided a method of controlling an EGR valve for a vehicle, the method including: an adjusting step of reducing the amount of air flowing into an engine at operation points of the engine lower than a predetermined value at each of the operation points by a controller; a learning step of maintaining, as a reduction-learning amount, a reduction amount of the amount of air from the predetermined value right before a malfunction occurs, by the controller, when a malfunction occurs in the engine due to the reduction in the amount of air; a compensating step of determining a compensating air amount at each of the operation points by applying the reduction amount to the predetermined value by the controller; and an EGR controlling step of controlling an EGR-opening amount to satisfy the compensating air amount for a current operation time after the compensating step.

In the learning step, when the reduction amount exceeds a limit set in advance for an operation point, the controller may maintain the limit as the reduction-learning amount at the operation point instead of the reduction amount.

In the learning step, the controller may check whether there is a malfunction in the engine by analyzing an angular acceleration of the engine.

When a difference between upper limits of the angular acceleration of the engine exceeds a standard difference, the controller may determine that there is a malfunction in the engine.

When a difference between upper limits of the angular acceleration of the engine larger than the standard difference is observed more than a standard number of times within a standard amount of time, the controller may determine that a malfunction may have occurred in the engine.

In various aspects of the present invention, according to another aspect of the present invention, there is provided a system for controlling an EGR valve for a vehicle, the system including: an engine, which provides power for driving a vehicle; an EGR valve, which is disposed in an EGR channel to guide exhaust gas from the engine 50 to an intake manifold; and a controller, which reduces the amount of air flowing into the engine at operation points of the engine lower than a predetermined value at each of the operation points, maintains, as a reduction-learning amount, a reduction amount of the amount of air from a predetermined value right before a malfunction occurs when a malfunction occurs in the engine due to the reduction in the amount of air, determines a compensating air amount for the operation points by applying the reduction-learning amount to the predetermined value, and controls an EGR-opening amount to satisfy the compensating air amount at a current operation point.

According to the method and system for controlling an EGR valve for a vehicle, it is possible to minimize the amount of noxious substances in exhaust gas by increasing an EGR amount while maintaining stable combustion in the engine.

Since the amount of air at each operation point of the engine is gradually reduced and the amount of air right before a malfunction occurs in the engine is learned, it is possible to more effectively reduce noxious substances by measuring the maximum EGR amount where stable combustion in engine is secure.

Further, when the reduction amount of the amount of air for the engine exceeds a limit, it is possible to effectively ensure stable combustion by maintaining the limit as the reduction-learning amount at the corresponding operation point.

Further, it is possible to effectively determine poor combustion in the engine due to an increase in the EGR amount by determining whether there is a malfunction in the engine based on a change in the angular acceleration of the engine.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
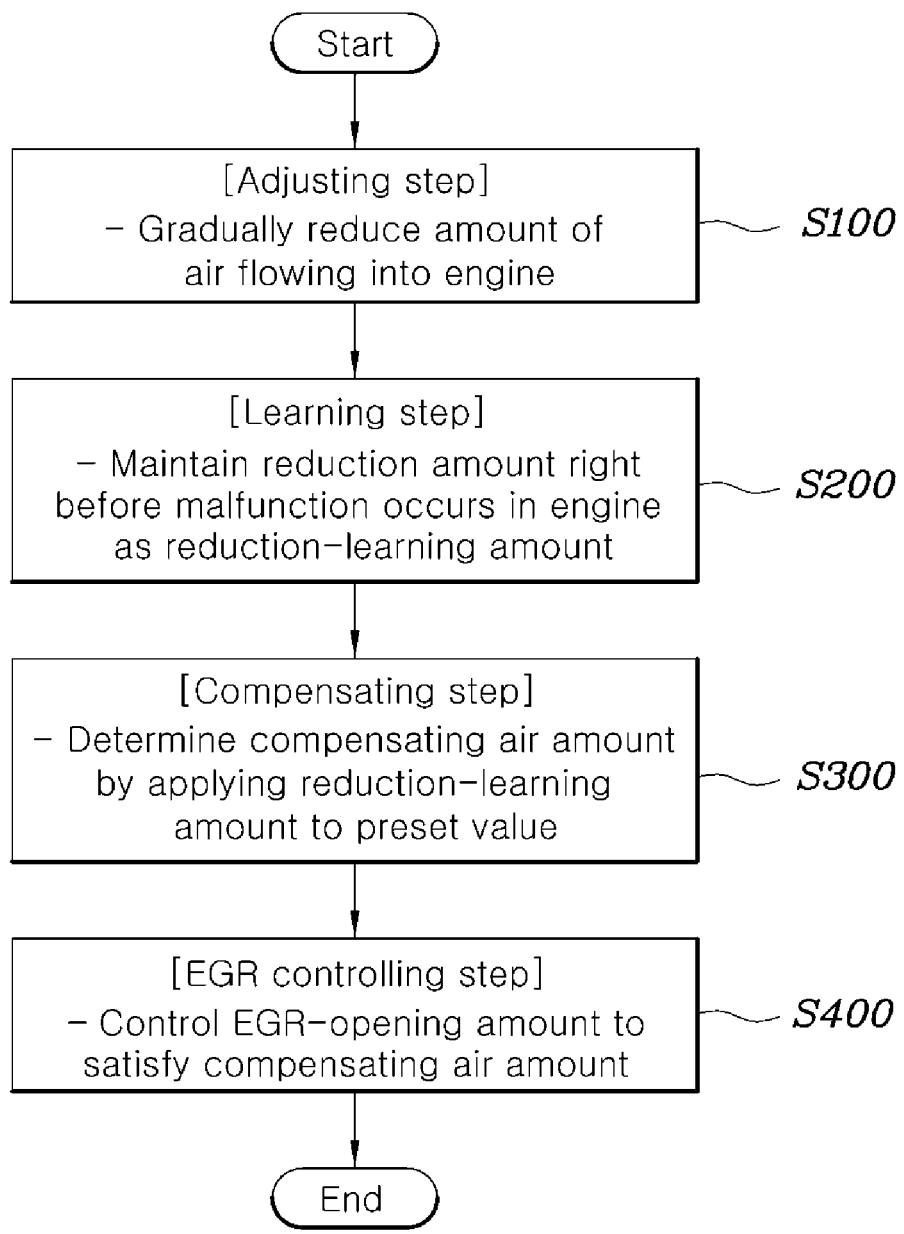
FIG. 1 is a flowchart illustrating a method of controlling an exhaust gas recirculation (EGR) valve for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Figure 2:
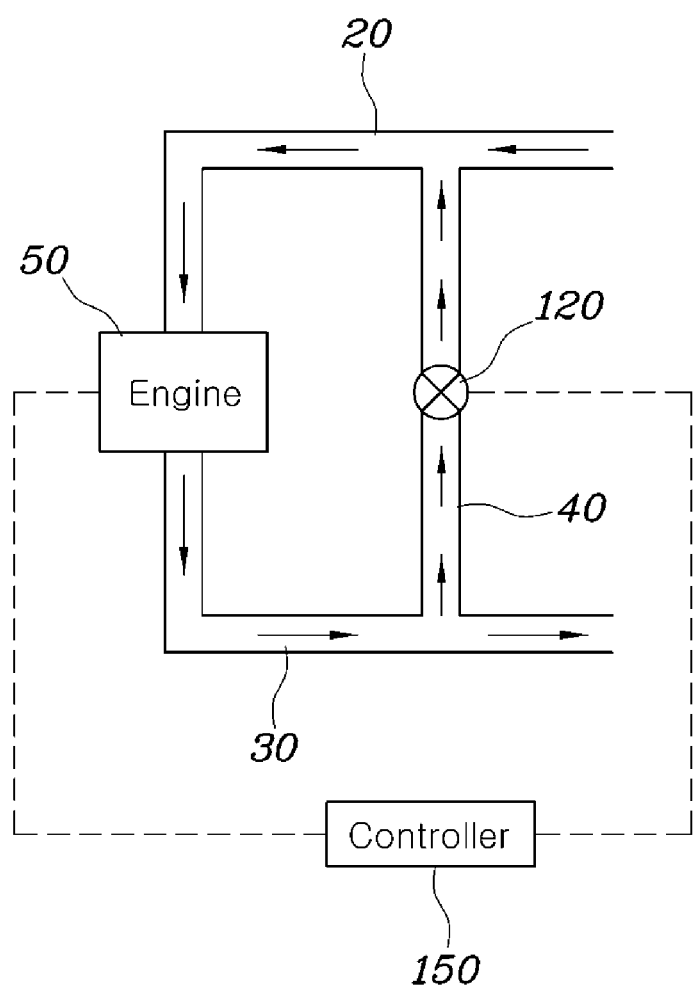
FIG. 2 is a diagram showing a system for controlling an EGR valve for a vehicle according to an exemplary embodiment of the present invention.

A method of controlling an exhaust gas recirculation (EGR) valve for a vehicle according to an exemplary embodiment of the present invention, as shown in FIG. 1 and FIG. 2, includes: an adjusting step (S100) of reducing the amount of air flowing into the engine 50 at operation points of the engine 50 lower than a predetermined value at each of the operation points by a controller 150; a learning step (S200) of maintaining as a reduction-learning amount the reduction amount of the amount of air from the predetermined value right before a malfunction occurs, by the controller 150, when a malfunction occurs in the engine 50 due to the reduction in the amount of air; a compensating step (S300) of determining a compensating air amount at each of the operation points by applying the reduction amount to the predetermined value by means of the controller 150; and an EGR controlling step (S400) of controlling an EGR-opening amount to satisfy the compensating air amount for the current operation time after the compensating step (S300).

In detail, in the adjusting step (S100), the controller 150 gradually reduces the amount of air flowing into the engine 50 at operation points of the engine 50 lower than a predetermined value at each of the operation points.

An EGR valve 120 controls the opening amount of an EGR channel 4 and the opening amount of the EGR channel 40 is referred to as the EGR-opening amount herein. The EGR-opening amount depends on the amount of air required by the engine 50, that is, the smaller the EGR-opening amount, the larger the amount of air flowing into the engine 50, and the larger the EGR-opening amount, the smaller the amount of air flowing into the engine 50.

The amount of air for each of the operation points of the engine is set in advance in the controller 150 to secure stable combustion in the engine 50. The amount of air set in advance for the operation points in the controller 150 are referred to as predetermined values herein.

In the adjusting step (S100), the controller 150 reduces the amount of air at the current operation point of the engine 50, in which the reduction amount is gradually increased. This operation may be performed at the operation points of the engine, depending on the driving situations of a vehicle.

In the learning step (S200), when a malfunction occurs in the engine 50 due to the reduction in the amount of air, the controller 150 maintains as a reduction-learning amount the reduction amount of the amount of air from the predetermined value right before the malfunction occurs.

When the amount of air flowing into the engine 50 falls below a predetermined level due to the increase in the reduction amount in the adjusting step (S100), a malfunction may occur in the engine 50. The malfunction of the engine 50 means that combustion in a specific cylinder becomes unstable and output from the engine is also unstable, and when the amount of air falls below a predetermined level at an operation point, such a malfunction may occur in the engine 50.

The present invention may have been made to determine the optimal reduction amount by reducing the amount of air below a predetermined value to determine the maximum allowable EGR-opening amount while maintaining stable combustion in the engine 50.

Accordingly, when a malfunction occurs in the engine 50 while the reduction amount of the amount of air at an operation point, the controller 150 maintains the reduction amount right before the malfunction occurs in the engine 50 as a reduction-learning amount, learning the optimal reduction amount, at which stable combustion can be maintained.

On the other hand, in the compensating step (S300), the controller 150 determines a compensating air amount at an operation point by applying the reduction-learning amount to the predetermined value. That is, by substituting the reduction-learning amount learned by the controller 150 for the predetermined value, the optimal amount of air, which is lower than the predetermined value and can ensure stable combustion, is determined as a compensating air amount.

In the EGR controlling step (S400), the controller 150 controls the EGR-opening amount to satisfy the compensating air amount at the current operation point after the compensating step (S300).

As described above, the EGR-opening amount is a value that depends on the amount of air, and the smaller the amount of air, the larger the EGR-opening amount. Accordingly, as combustion is maintained stable and the EGR-opening amount is controlled in accordance with the compensating air amount, which is reduced as far below the predetermined set value as possible, the predetermined invention can greatly improve the efficiency with which noxious substances are removed from exhaust gas by performing control to maximize the EGR amount while maintaining stable combustion at the operation points of the engine 50.

Further, according to the method of controlling an EGR valve for a vehicle of an exemplary embodiment of the present invention, in the learning step (S200), when the reduction amount exceeds a limit set in advance for an operation point, the controller 150 maintains the limit as the reduction-learning amount at the operation point, rather than the reduction amount.

The predetermined value, which is the amount of air for the engine 50, is chiefly determined in consideration of stable combustion in the engine 50. Accordingly, the present invention performs a process of gradually increasing the reduction amount of the amount of air to determine the optimal amount of air at which stable combustion can be actually maintained, and, depending on the driving conditions, stable combustion may be maintained even with the same reduction amount, or a malfunction may occur in the engine 50 due to unstable combustion.

Therefore, in an exemplary embodiment of the present invention, a limit, which is determined theoretically or experimentally in advance for each of the operation points of the engine 50, is maintained in advance in the controller 150, and when the reduction amount right before a malfunction occurs in the engine 50 exceeds the limit, the limit is maintained as a reduction-learning amount to keep the combustion more stable.

That is, the limit, which is a value determining a limit of the reduction amount for securing at least minimum stability of combustion in an exemplary embodiment of the present invention, may be determined as various values in consideration of the control strategy on a basis of theoretical and experimental results, as described above.

As a result, according to an exemplary embodiment of the present invention, the EGR-opening amount is maximized at the operation points and the reduction amount of the amount of air is learned on a basis of the limit for securing at least minimum stability of combustion in consideration of various changes in driving conditions.

Figure 3:
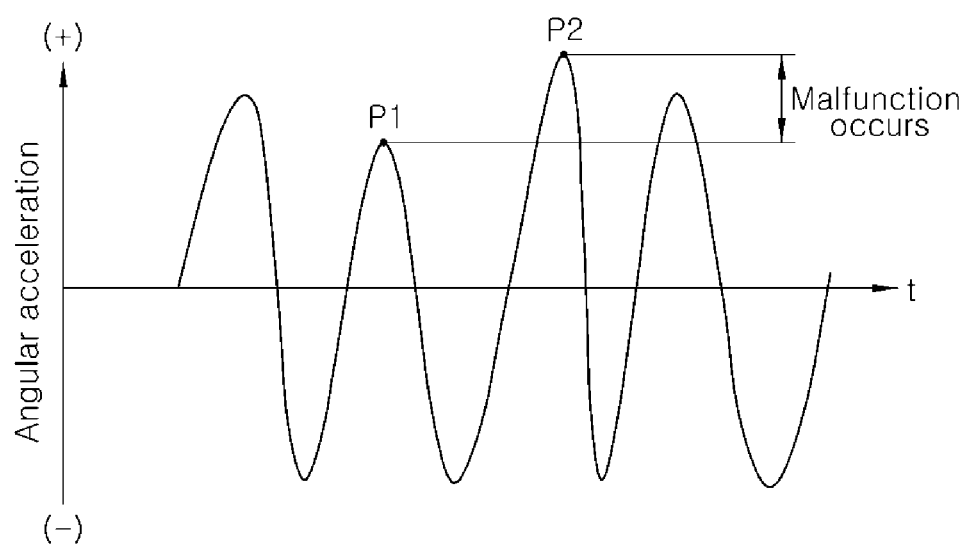
FIG. 3 is a graph showing a change in angular acceleration of an engine when there is a malfunction in the engine in a method of controlling an EGR valve for a vehicle according to an exemplary embodiment of the present invention.

Meanwhile, as shown in FIGS. 1 to 3, according to the method of controlling an EGR valve for a vehicle of an exemplary embodiment of the present invention, the controller 150 checks whether there is a malfunction in the engine 50 by analyzing the angular acceleration of the engine 50 in the learning step (S200).

According to an exemplary embodiment of the present invention, it is important to recognize a malfunction in the engine 50 to reduce the amount of air below a predetermined value in the related art and to determine the optimal compensating air amount at which stable combustion can be maintained.

To this end, a malfunction in the engine 50 is effectively determined by analyzing the angular acceleration of the engine 50 in an exemplary embodiment of the present invention. When a malfunction occurs in the engine 50, it means that the output from the engine 50 is unstable, and the instability of the output is reflected in the angular acceleration of the engine 50. The abnormality of the angular acceleration waveform of the engine 60 is shown in a form of a graph in FIG. 3.

That is, when a malfunction occurs in the engine 50, abnormality in the angular acceleration waveform of the engine 50 is evident, and a malfunction in the engine 50 is more clearly found by analyzing a change in the angular acceleration of the engine 50 in an exemplary embodiment of the present invention.

Further, as shown in FIGS. 1 to 3, according to the method of controlling an EGR valve for a vehicle of an exemplary embodiment of the present invention, when a change in the upper limit of the angular acceleration of the engine 50 is a standard reference or more, the controller 150 determines that a malfunction has occurred in the engine 50.

In detail, when a malfunction occurs in the engine 50, combustion in the engine becomes unstable, and The variation in output among the cylinders is increased. This phenomenon can be found from the angular acceleration of the engine 50, FIG. 5 shows an increase in the upper limit of angular acceleration of the engine 50 due to the difference in output from cylinders, attributable to a malfunction in the engine 50.

In an exemplary embodiment of the present invention, the standard reference is a reference for determining whether the difference between the upper limits of the angular acceleration of the engine 50 is increased beyond a normal range, in which case it can be considered to be a malfunction in the engine 50, and it can be variously determined on the basis of theoretical or experimental results.

That is, according to an exemplary embodiment of the present invention, whether there is a malfunction in the engine is checked on a basis the difference between upper limits of the angular acceleration of the engine 50 in order to improve the accuracy with which a malfunction of the engine is determined, and then a standard reference is set and the current difference is compared with the standard difference in order to exclude an erroneous noise-related result of the measurement of the difference between upper limits of the angular acceleration of the engine 50 due to various reasons.

Meanwhile, in the method of controlling an EGR valve for a vehicle according to an exemplary embodiment of the present invention, when a difference between upper limits of the angular acceleration of the engine larger than the standard difference is observed more than a standard number of times within a standard amount of time, the controller 150 determines that a malfunction has occurred in the engine 50.

As described above, even if whether the difference between the upper limits of the angular acceleration of the engine 50 is larger than the standard difference is determined in order to improve the accuracy with which a malfunction of the engine 50 is determined, the difference between the upper limits of the angular acceleration of the engine 50 may be increased for various reasons.

The difference in the angular acceleration of the engine 50 may be temporarily increased for various reasons even if there is no malfunction in the engine 50, in which case it would be inappropriate to determine such a situation as a malfunction of the engine 50.

To prevent this case, in an exemplary embodiment of the present invention, it is determined whether a difference between the upper limits of the angular acceleration of the engine 50 larger than the standard difference is observed more than a standard number of times within a standard amount of time.

Observation of a difference larger than the standard difference more than a standard number of times within a standard amount of time means that the probability that the above case has occurred is greater than a standard probability.

That is, according to an exemplary embodiment of the present invention, the probability that a difference larger than the standard difference will occur is determined in order to distinguish an actual malfunction of the engine 50 from an incidental increase of the difference, thereby improving the accuracy with which a malfunction in the engine 50 is determined.

The standard amount of time and the standard number of times (or standard probability) may be determined in various ways on the basis of experimental results.

Meanwhile, a system for controlling an EGR valve for a vehicle according to an exemplary embodiment of the present invention, as shown in FIG. 2, includes: an engine 50 that provides power for driving a vehicle; an EGR valve 120 that is disposed in an EGR channel 40 for guiding exhaust gas from the engine 50 to an intake manifold; and a controller 150 that reduces the amount of air flowing into the engine 50 at operation points of the engine 50 lower than a predetermined value at each of the operation points, maintains as a reduction-learning amount a reduction amount of the amount of air from a predetermined value right before a malfunction occurs when a malfunction occurs in the engine 50 due to the reduction in the amount of air, determines a compensating air amount for the operation points by applying the reduction-learning amount to the predetermined value, and controls an EGR-opening amount to satisfy the compensating air amount at the current operation point.

In detail, the engine 50 is provided to supply power for driving a vehicle, and an intake channel 20 and an exhaust channel 30 are provided. The EGR valve 120 is positioned in the EGR channel 40 to guide some of the exhaust gas into the intake manifold to control an EGR amount.

Further, the EGR-opening amount of the EGR valve 120 is a value that depends on the amount of air flowing into the engine 50. As described above, the larger the amount of air, the larger the EGR-opening amount, and when the amount of air decreases, the EGR-opening amount and the EGR amount also decrease.

Meanwhile, the controller 150 gradually reduces the amount of air flowing into the engine 50 at operation points of the engine 50 lower than a predetermined value at each of the operation points, maintains as a reduction-learning amount a reduction amount of the amount of air from a predetermined value right before a malfunction occurs when a malfunction occurs in the engine 50 due to the reduction in the amount of air, determines a compensating air amount for the operation points by applying the reduction-learning amount to the predetermined value; and controls an EGR-opening amount to satisfy the compensating air amount at the current operation point.

The controller 150 is connected to the engine 50 and the EGR valve 120 and may be an ECU, which is an engine control unit, or may be provided independently from an ECU to control an EGR system.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling an exhaust gas recirculation (EGR) valve for a vehicle, the method comprising:
    an adjusting step of reducing an amount of air flowing into an engine at operation points of the engine lower than a predetermined value at each of the operation points by a controller, wherein the amount of air is reduced by controlling opening amount of an EGR channel by the EGR valve;
    an acquiring step of maintaining, as a reduction-learning amount, a reduction amount of the amount of air from the predetermined value before a malfunction occurs, by the controller, when the malfunction occurs in the engine due to a reduction in the amount of air;
    a compensating step of determining a compensating air amount at each of the operation points by applying the reduction amount to the predetermined value by the controller; and
    an EGR controlling step of controlling an EGR-opening amount to satisfy the compensating air amount for a current operation time after the compensating step,
    wherein, in the acquiring step, when the reduction amount exceeds a limit set in advance for an operation point, the controller maintains the limit as the reduction-learning amount at the operation point instead of the reduction amount.

2. The method of claim 1, wherein, in the acquiring step, the controller cheeks whether there is the malfunction in the engine by analyzing an angular acceleration of the engine.

3. The method of claim 2, wherein when a difference between upper limits of the angular acceleration of the engine exceeds a predetermined difference, the controller determines that there is the malfunction in the engine.

4. The method of claim 2, wherein when a difference between upper limits of the angular acceleration of the engine larger than a predetermined difference is observed more than a predetermined number of times within a predetermined time period, the controller determines that the malfunction has occurred in the engine.

5. A system for controlling an exhaust gas recirculation (EGR) valve for a vehicle, the system comprising:
    an engine providing power for driving the vehicle;
    an EGR valve positioned in an EGR channel for guiding exhaust gas from the engine to an intake manifold; and
    a controller reducing an amount of air flowing into the engine at operation points of the engine lower than a predetermined value at each of the operation points, maintaining, as a reduction-learning amount, a reduction amount of the amount of air from the predetermined value before a malfunction occurs when the malfunction occurs in the engine due to a reduction in the amount of air, determining a compensating air amount for the operation points by applying the reduction-learning amount to the predetermined value, and controlling an EGR-opening amount to satisfy the compensating air amount at a current operation point,
    wherein the amount of air is reduced by controlling opening amount of the EGR channel by the EGR valve, and
    wherein, in the maintaining, as a reduction-learning amount, a reduction amount of the amount of air from the predetermined value before a malfunction occurs when the malfunction occurs in the engine due to a reduction in the amount of air, when the reduction amount exceeds a limit set in advance for an operation point of, the controller maintains the limit as the reduction-learning amount at the operation point instead of the reduction amount.

\* \* \* \* \*